US012370100B1

(12) United States Patent
Slagerman

(10) Patent No.: US 12,370,100 B1
(45) Date of Patent: Jul. 29, 2025

(54) WHEELCHAIR FRAME FOLDING MECHANISM

(71) Applicant: Ki Mobility LLC, Stevens Point, WI (US)

(72) Inventor: Murray G. Slagerman, MB (CA)

(73) Assignee: Ki Mobility LLC, Stevens Point, WI (US)

( * ) Notice: Subject to any disclaimer, the term of this patent is extended or adjusted under 35 U.S.C. 154(b) by 559 days.

(21) Appl. No.: 17/831,847

(22) Filed: Jun. 3, 2022

Related U.S. Application Data

(60) Provisional application No. 63/197,086, filed on Jun. 4, 2021.

(51) Int. Cl.
*A61G 5/08* (2006.01)

(52) U.S. Cl.
CPC .................................... *A61G 5/08* (2013.01)

(58) Field of Classification Search
CPC .... A61G 5/0875; A61G 5/125; A61G 5/1083; A61G 5/0883; A61G 5/0816; A61G 2220/10; A61G 5/0825; A61G 5/08; A61G 5/1062; A61G 5/00; A47B 2003/0835
USPC ......................................................... 280/650
See application file for complete search history.

(56) References Cited

U.S. PATENT DOCUMENTS

| | | | | |
|---|---|---|---|---|
| 5,560,627 A * | 10/1996 | Zatulovsky | A61G 5/128 | 280/42 |
| 6,227,559 B1 * | 5/2001 | Slagerman | A61G 5/0825 | 280/250.1 |
| 6,616,172 B1 * | 9/2003 | Cockram | A61G 5/08 | 280/647 |
| 9,655,794 B2 * | 5/2017 | Bednarz, III | A61G 5/1062 | |
| 11,364,163 B1 * | 6/2022 | Foonberg | A61G 5/0875 | |
| 11,559,136 B1 * | 1/2023 | Lin | A47B 3/087 | |
| 2019/0240091 A1 * | 8/2019 | Perkins | A61G 5/1062 | |

* cited by examiner

*Primary Examiner* — James A Shriver, II
*Assistant Examiner* — Hilary L Johns
(74) *Attorney, Agent, or Firm* — Thedford I. Hitaffer; Hitaffer & Hitaffer, PLLC

(57) ABSTRACT

A system of non-parallel folding planar cross-braces are adapted to naturally fold away from one another to provide a naturally rigid structure that requires little or no latching to provide a stable frame. An interlocking system that engages opposing pivot points of the cross-braces can be arranged to create a very rigidly connected frame. A variation of the system may allow for both a sling seat and an open frame for attached seating to utilize the opposing planar cross-braces.

18 Claims, 13 Drawing Sheets

WHEELCHAIR FRAME FOLDING MECHANISM

CROSS-REFERENCE TO RELATED APPLICATIONS

This application claims priority to U.S. Provisional Patent Application No. 63/197,086, filed on Jun. 4, 2021, the disclosure of which is incorporated herein by reference.

BACKGROUND OF THE INVENTION

This invention relates in general to wheelchairs, and more particularly, to folding mechanisms for wheelchairs.

Wheelchairs are often desired to be portable. To enable ease of transport, a common approach is to devise means for folding the frame of the wheelchair when the occupant has been removed to provide a more compact size.

The most common approach to folding a wheelchair frame employs a tubular cross-brace system having a center pinned pivot point where two cross tubes connect and a lower pivot at the bottom of opposing side frames is connected to the bottom of the cross tubes. A top portion of the cross tubes is typically connected with a linkage to the top of the side frames. A perpendicular tube is supported in relation to the top of each cross tube. The perpendicular tubes support a sling seat and rest in relation to the top of the side frames to provide a stable frame. In this typical arrangement, when folding the wheelchair, the seat sling is simply pulled upward, which in turn causes the cross tubes to pivot inward and fold the wheelchair frame, particularly, the side frames side-to-side. The ease of this folding actuation has made this approach the most widely used approach in wheelchair design.

A limitation to tubular cross-brace systems is that the seat sling must attach to the perpendicular tubes because the sling cannot attach directly to the side frames and still allow clearance for the folding cross tubes. Vertically, the rise of the cross-brace system hardware would interfere with a sling attached directly to the wheelchair frame.

There are other cross-brace systems that utilize a scissor fold or linkage arrangement to control the attachment of the cross-brace system to the side frames. Typically, this control is achieved by utilizing a latching arrangement of the cross-brace elements, wherein the locking element locks the cross-brace elements in an unfolded position to create a stable frame. In these systems, the seat sling is not pulled to initiate folding of the frame. Instead, an element connected to the cross-brace elements must be actuated to unlock the cross-brace elements and initiate folding of the frame. These systems are often used without a sling-seat. Instead, these systems are more adapted to be used with a more rigidly attached form of seating. In these systems, there are generally pinned elements that hinge about pivot points that have parallel pivot axes, resulting in a parallelogram folding arrangement. Due to this parallelogram folding arrangement, the locking element must be sufficiently robust to resist the tendency of the system to fold.

SUMMARY OF THE INVENTION

The invention relates to a system of non-parallel folding planar cross-braces, which are adapted to naturally fold away from one another to provide a naturally rigid structure that requires little or no latching to provide a stable frame. An interlocking system that engages opposing pivot points of the cross-braces can be arranged to create a very rigidly connected frame.

A variation of the system may allow for both a sling seat and an open frame for attached seating to utilize the opposing planar cross-braces. An advantage from the arrangement is the ability to maintain ease of folding associated with a sling actuated fold structure with a very rigid unfolded structure and a cross-brace system that is uniquely compact, avoiding interference with the sling or attached seating.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the invention will become more fully appreciated when considered in view of the accompanying drawings, in which like reference characters designate the same or similar parts and/or features throughout the several views, and wherein.

DETAILED DESCRIPTION OF THE PREFERRED EMBODIMENT

Figure 1:
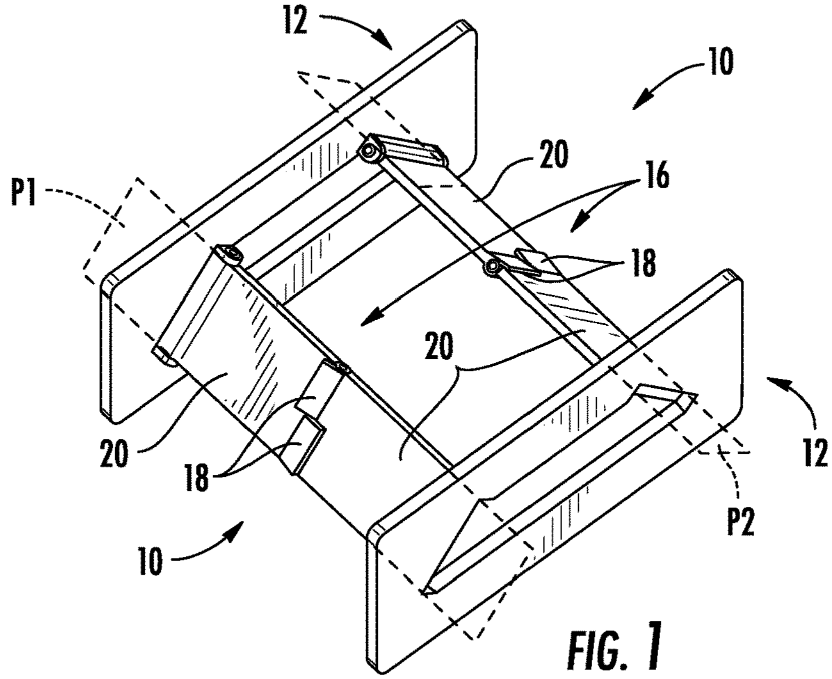
FIGS. 1-3 are perspective diagrammatic representational views of a folding frame with non-parallel panel folding cross-braces in unfolded, partially folded and folded positions.
Figure 2:
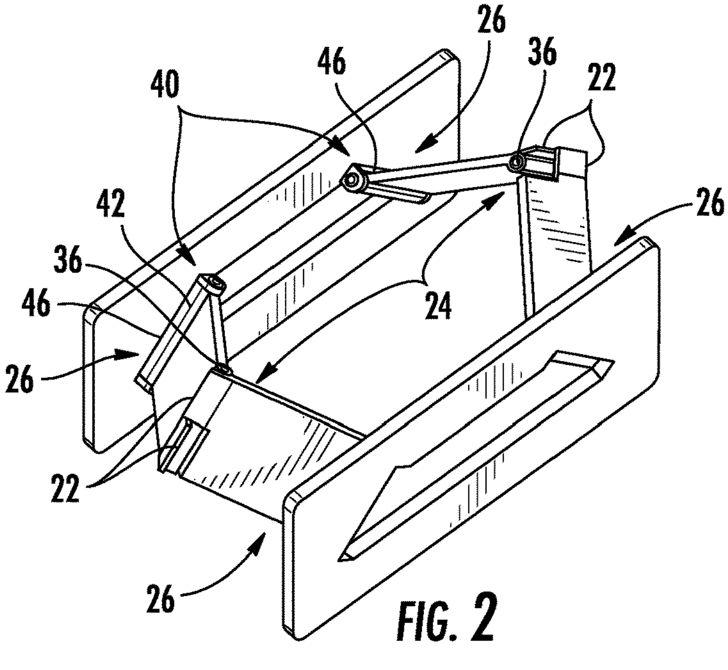
Figure 3:
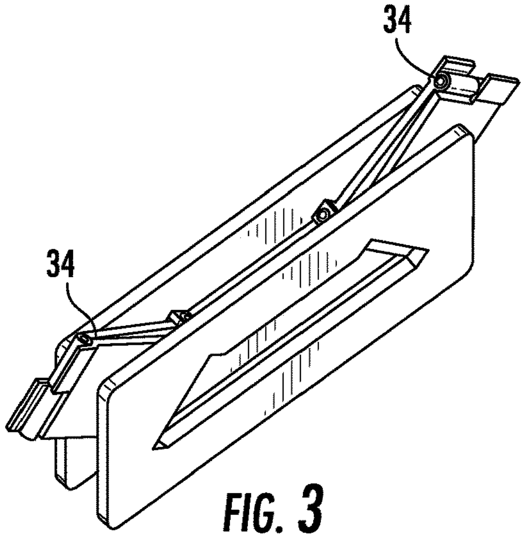

Referring now to the drawings, there are illustrated in FIGS. 1-3 diagrammatic representations of folding planar cross-braces or members 10 supported in relation to side frames 12. The planar cross-braces 10 may be in the form of pivoting planar cross-braces that reside on non-parallel planes P1, P2 when unfolded, a geometry that creates a degree of inherent stability for a wheelchair frame (not shown). The cross-braces 10 may be provided with a pivot or hinge 16 and has a stop 18, preferably built-in, to limit the pivot or hinge 16 from opening to 180 degrees to create a stable open structure for a wheelchair.

Figure 4:
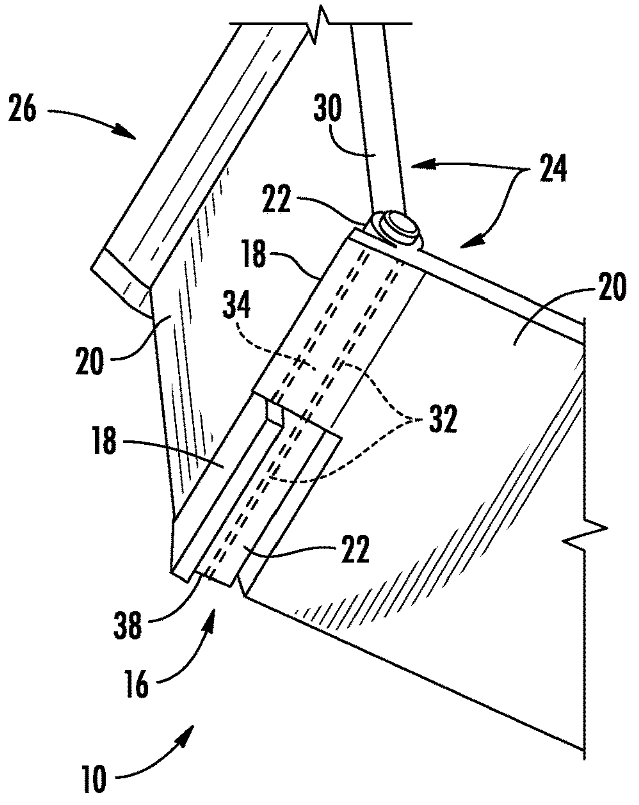
FIG. 4 is an enlarged view of a pivot for connecting cross-brace members.

The cross-braces 10 may comprise members 20, which may be in the form of planar panels, frame members, including, for example, tubular and solid frame members, which may be extruded, or otherwise formed or fashioned. In the illustrated embodiment, the pivot 16 may comprise a knuckle 22 associated with each cross-brace member 20, for example, at a distal end 24 thereof, opposite from the proximal end 26, which is closest to the side frame 12. The knuckle 22 of each cross-brace member 20 is situated in axial alignment with the knuckle 22 of the other cross-brace member 20. A hole 32 (shown in FIG. 4) passes through each knuckle 22 for receiving a pin 34 (shown in FIG. 4) therethrough for coupling the knuckles 22 together for pivotal movement in relation to one another. The pin 34 may be comprised of a head or tip 36 that limits movement of the pin 34 through the holes 32. The pin 34 can be axially fixed in relation to the knuckles 22 in any suitable manner to permit movement of one knuckle 22 in relation to the other knuckle 22. This can be done, for example, with a fastener. For example, an end of the pin 34 opposite the head 36, extending beyond one knuckle 22, may be provided with an annular groove for receiving a snap fastener, such as a retainer ring, including a circlip (i.e., C-clip), an e-clip or other suitable snap fastener. Alternatively, a hole may be provided through the end of the pin 34 for receiving a hair pin, cotter pin, or similar fastener. The pin 34 may also be axially fixed in relation to the knuckles 22 by a push-on fastener, such as a top hat push nut, a flat round push nut, a spider fix washer, or other suitable push-on fastener. As yet another alternative, the end of the pin 34 opposite the head 36 may be threaded to threadably engage a threaded fastener, such as a nut. One of the knuckles 22 may be threaded, while the other two knuckles 22 may be provided with a through hole so that the pin 34 may pass through one knuckle 22 and threadably engage the other knuckle 22. Although only two knuckles 22 are shown, it should be appreciated that a plurality of knuckles 22 exceeding two may be provided. Although the pivot 16 in the illustrated embodiment is shown proximate the center of the cross-brace 10, the pivot 16 may be provided medially of the cross-brace 10, other than at the center or proximate the center.

A stop 18 may be supported in relation to one of the cross-brace members 20 or each one of the cross-brace members 20. The stop 18 may be in the form of a finger, tab, extension, protrusion, plate or other suitable structure, extending or originating from, or associated with, or supported in relation to the cross-brace member 20, or each cross-brace member 20. The stop 18 on one cross-brace member 20 is engageable or otherwise cooperates with the other cross-brace member 20 to limit movement of the cross-brace 10, or cross-brace members 20, in relation to one another. In the illustrated embodiment, movement is limited to about 180 degrees. However, this limited movement may be at some suitable movement that is less than 180 degrees. Although a single stop 18 is shown associated with each cross-brace member 20, it should be appreciated that multiple stops 18 could be associated with one or each of the cross-brace members 20.

Figure 5:
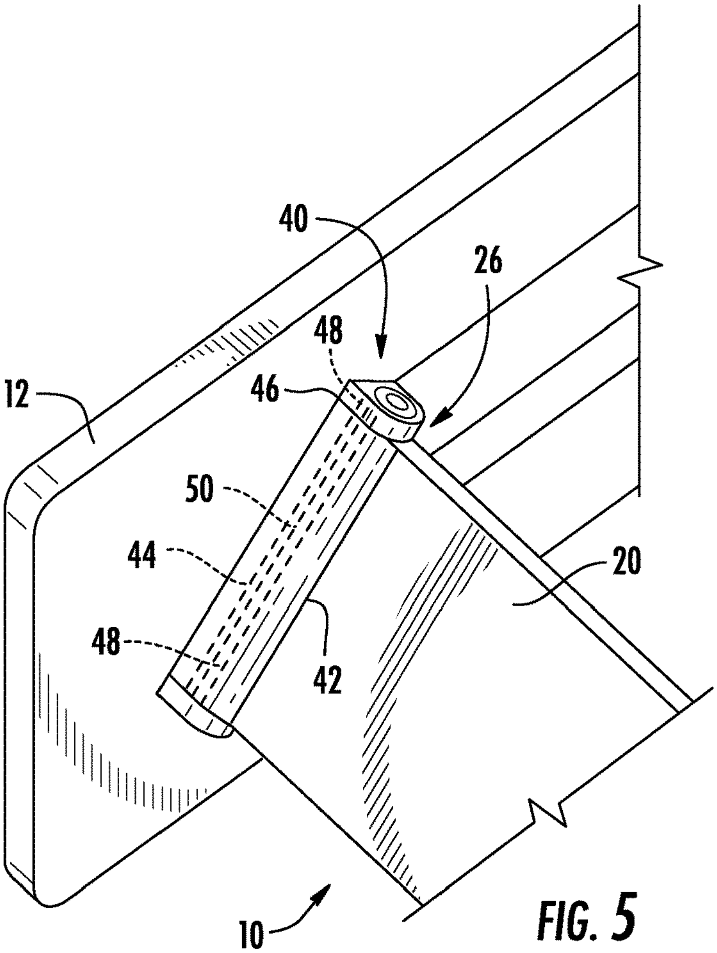
FIG. 5 is an enlarged view of a pivot for connecting cross-brace members to side frames.

Each cross-brace member 20, opposite the cross-brace pivot 16, may comprise a side frame pivot 40 for supporting the cross-brace members 20 for pivotal movement in relation to respective side frames 12. As shown in the drawings, a sleeve 42 or other suitable structure may be associated or supported in relation to the proximal end 26 of the cross-brace member 20. The sleeve 42 may be comprised of a hole 44 passing therethrough, as seen in FIG. 5. A mating structure, such as a C-shaped bracket 46 or other suitable structure may be supported in relation to each of the side frames 12. A hole 48 may pass through opposing ends of the C-shaped bracket 46. A pin 50 may be provided for passing through the holes 44, 48. The pin 50 may be supported in fixed axial relation to the sleeve 42 and the C-shaped bracket 46 in any suitable manner, for example, as described in connection with the pin 34 described above. It should be appreciated that the side frame pivot 40 may be structured in any suitable manner, such as, for example, like the cross-brace pivot 16 described above.

FIG. 1 shows a representation of the cross-braces 10 fully opened, in the unfolded position, with the stops 18 engaging opposing cross-brace members 20, to stop or limit the movement or travel of the cross-brace members 20, in the illustrated embodiment, about 180 degrees, although the movement could be some other limited movement, for example, less than 180 degrees. In this position, the side frames 12 are fully spaced apart, or the furthest distance apart, so as to be in an unfolded position. In this drawing, the stops 18 are shown extending from the cross-brace members 20, overlapping the opposing cross-brace member 20.

FIG. 2 shows a representation of the cross-braces 10 partially opened or closed, in a partially unfolded or folded position, with the stops 18 extending from the cross-brace members 20, but not in engagement with the opposing cross-brace members 20.

FIG. 3 is a representation of the cross-braces 10 fully closed, in the folded position, with the stops 18 extending from cross-brace members 20, but not in engagement with the opposing cross-brace members 20. In this position, the cross-brace members 20 are folded side-to-side or substantially side-to-side, and the side frames 12 are juxtaposed or substantially juxtaposed the cross-brace members 20, or otherwise in a compact orientation. This position represents a folded condition for a wheelchair.

Figure 6:
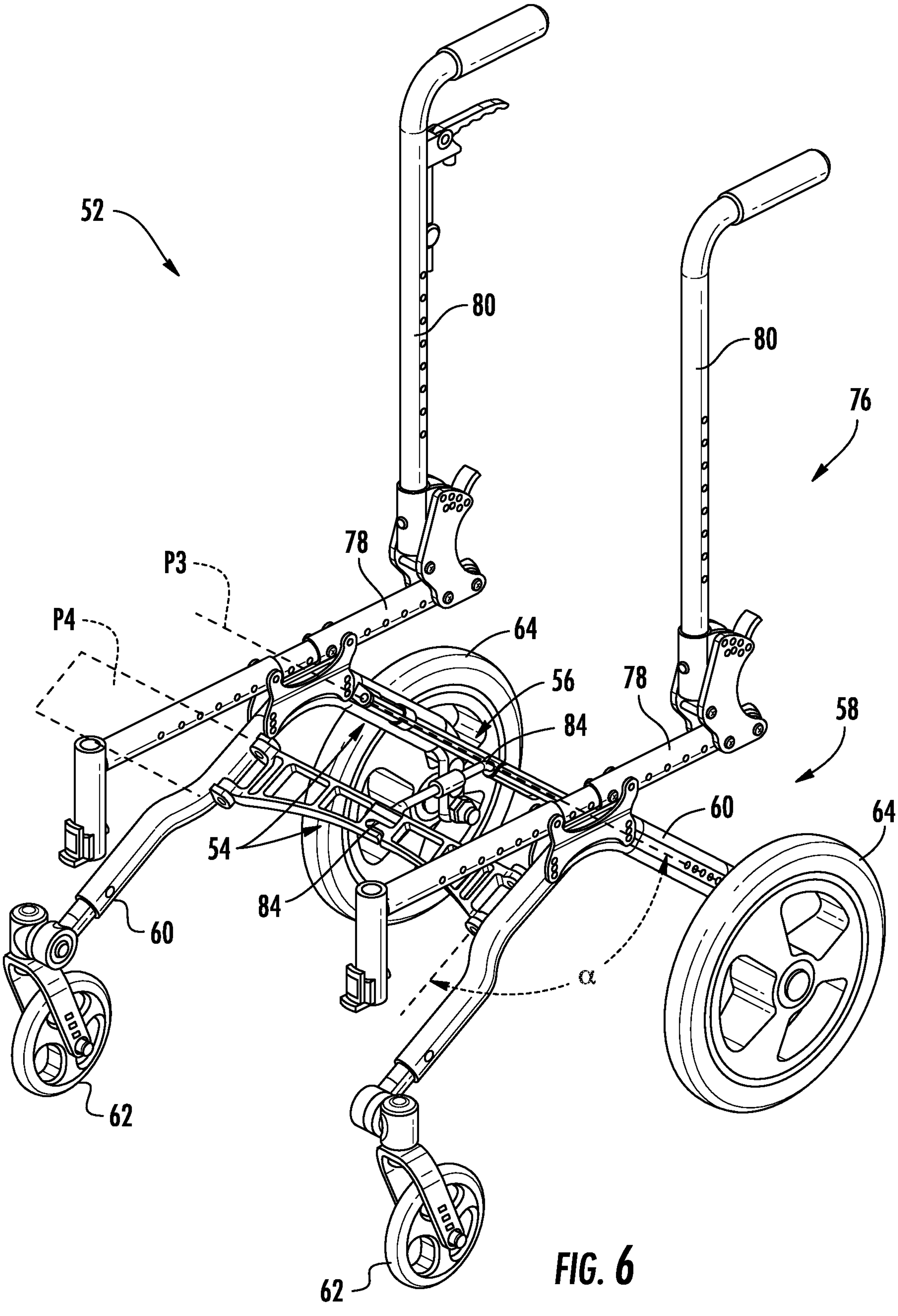
FIG. 6 is a perspective view of a wheelchair with an open frame for a seating system, wherein the wheelchair is unfolded.

FIG. 6 shows an open-framed wheelchair 52 (i.e., without a seat sling) in the unfolded position, using two folding planar cross-braces 54 that reside in opposed non-parallel planes P3, P4 at an angle $\alpha$ in relation to one another when unfolded and incorporating a central self-aligning latch 56 that latches or locks the planar cross-braces 54 into an opened or unfolded position. The wheelchair 52 may be comprised of a base frame 58 comprising the cross-braces 54 and opposing side frames 60, with front caster wheels 62 and rear wheels 64 supported in relation to the side frames 60 for supporting the side frames 60 in relation to a supporting surface (e.g., the floor or ground). The cross-braces 54 may be supported for pivotal movement in relation to the side frames 60 by a pivot 66, which may include pivot bosses 68 supported in relation to cross-brace members 70, which align with a clevis or tabs 72 supported in relation to the side frames 60, as more clearly shown in FIG. 7. A pivot pin or pins 74 or other suitable structure may be provided for coupling the bosses 68 to the tabs 72. A seat frame 76, including seat tubes 78 and back tubes or canes 80, may be supported for pivotal movement in relation to the side frames 60 for supporting a wheelchair occupant. Although the base frame 58 and seat frame 76 shown are generally formed of tubular construction, with brackets for supporting adjoining parts or components, the wheelchair 52 may be formed in any suitable manner. The base and seat frames 58, 76 may be formed of metal or other suitable material, and various parts or components thereof may be formed of metal or plastic, or other suitable materials or a combination of materials. Various parts and components of the wheelchair 52 may be adjustable, telescopically or otherwise, and joined together using weldments or threaded fasteners, or other suitable fasteners, such as those shown but not referenced throughout the drawings.

Figure 7:
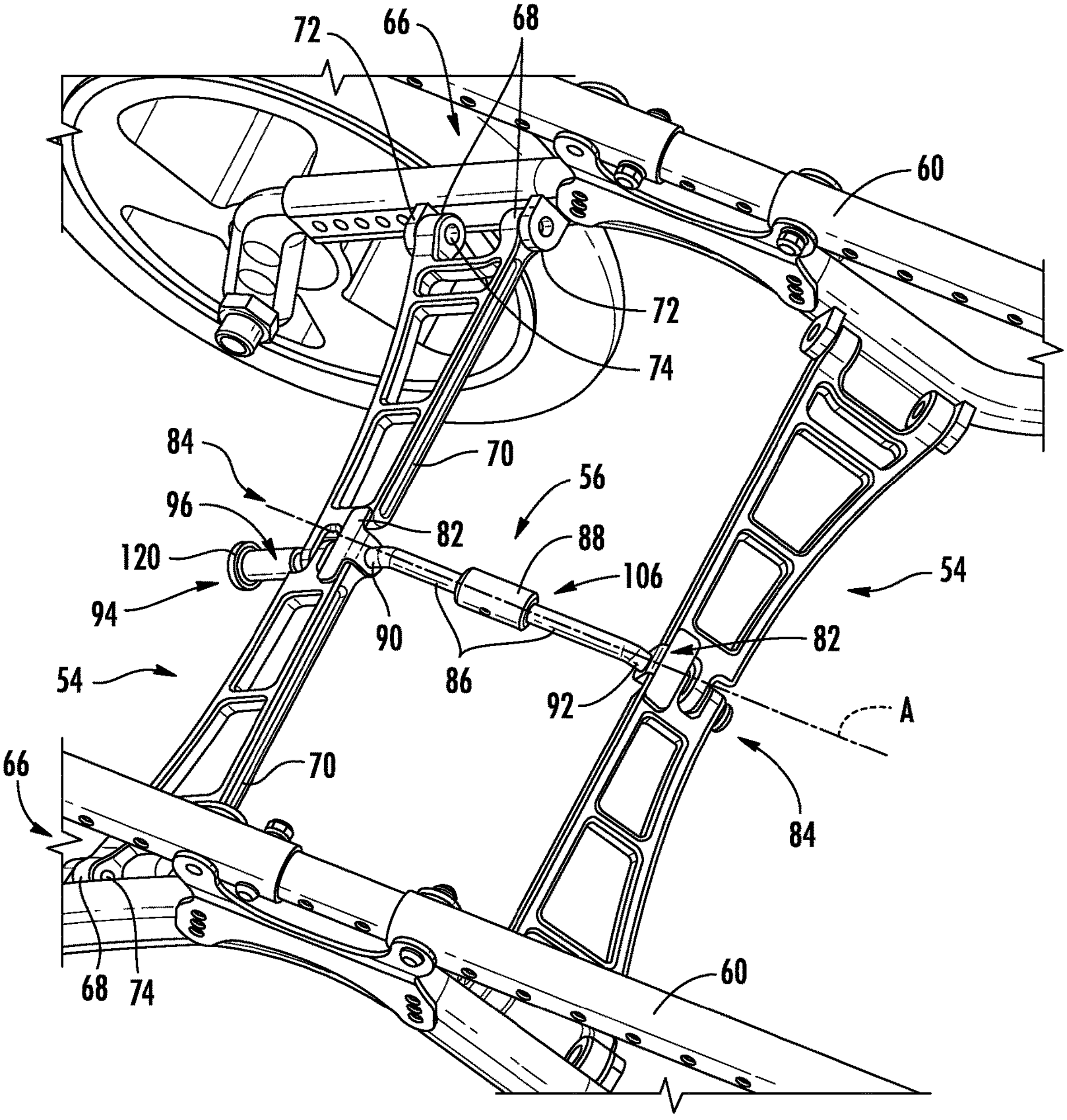
FIGS. 7-9 are enlarged perspective views of the wheelchair shown in FIG. 6, in relevant part, showing a fold and latch system.

FIG. 7 shows a partial, enlarged view of the wheelchair 52 shown in FIG. 6, with the planar cross-braces 54 unfolded, with stops 82, which may be similar to the stops described above with reference to FIGS. 1-3, engaging the cross-brace members 70 to limit the movement or travel of the cross-brace members 70. The cross-brace members 70 may be substantially planar members. The cross-brace members 70 may be molded, extruded or formed in another suitable manner. The cross-brace members 70 may be joined together with a pivot 84 with the stops 82 extending from the cross-brace members 70 so as to be engageable with opposing cross-brace members 70 when the cross-brace 54 is moved to the opened or unfolded position. In this embodiment, the stops 82 are fixed to the pivot pins 90, 92 so as to create alignment of both of the cross-brace members 70 in the open position and in axial alignment of the latching members 86 along axis A in the open position, as described hereinbelow. The cross-brace 54 may be held in the opened or unfolded position by latching members 86 of the central self-aligning latch 56, as will become more apparent in the description that follows.

Figure 8:
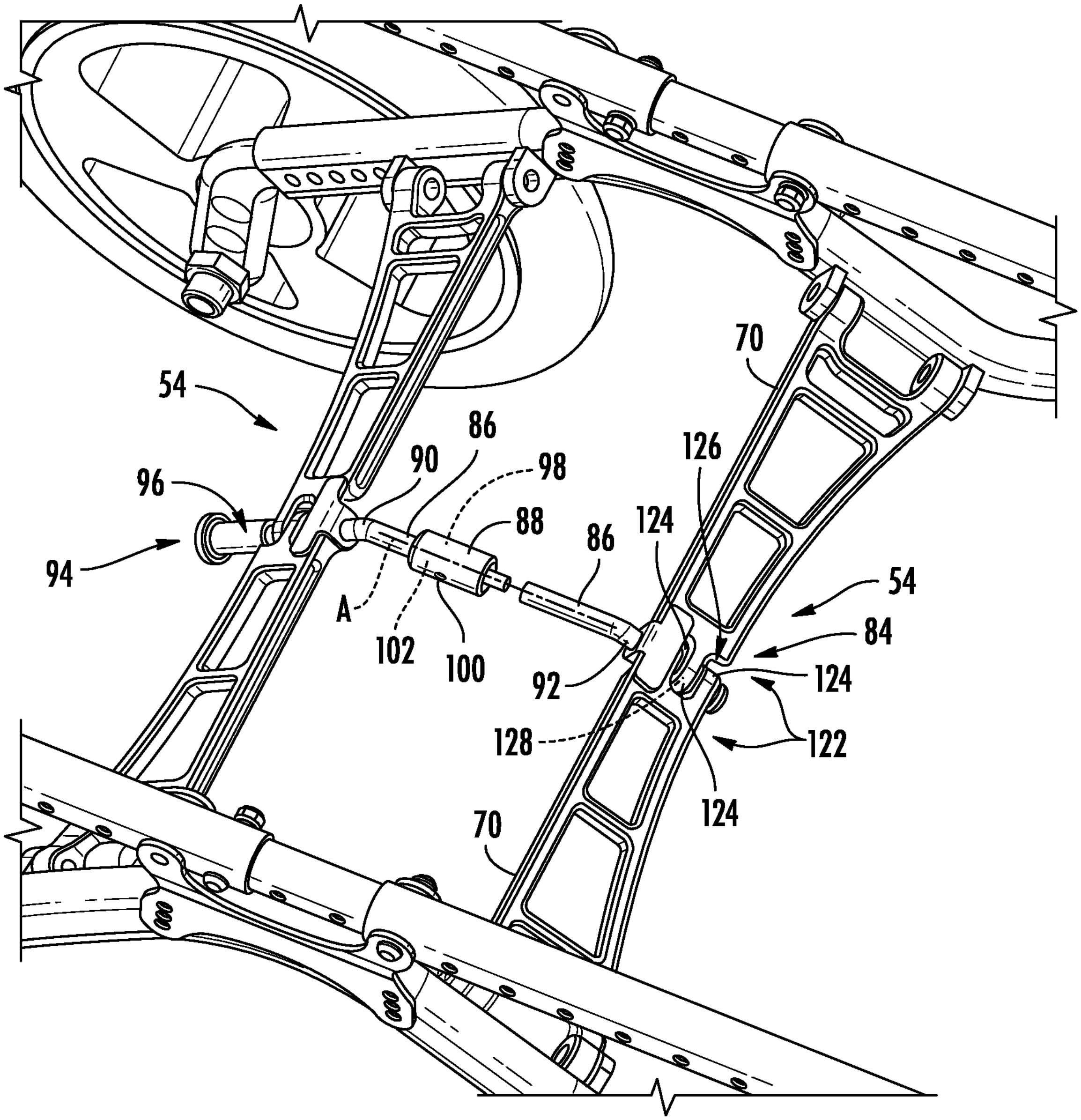

FIG. 8 shows relevant portions of the wheelchair shown in FIG. 6, with the planar cross-braces 54 and the latching members 86 disengaged to enable the wheelchair 52 to be folded. As is clearly shown in the drawings, a sliding collar 88 has been disengaged along an axis A of aligned pivot pins 90, 92. A pull handle and collar latch assembly 94 may be comprised of a sliding pull handle 96 extending toward or accessible from the rear of the wheelchair 52 (to the left when viewing FIG. 6). The handle 94 may be coupled to the collar 88 by a cable 98 that may be pinned to the collar 88 by a laterally extending pin 100. An internal spring 102 may be provided within the collar 88 to naturally extend or bias forward to push or urge the collar 88 forward in a sliding manner along a pivot pin 90 towards the rear of the wheelchair 52 to engage the collar 88 with a pivot pin 92 towards the front of the wheelchair 52 when a force is not applied to the pull handle 96 rearward to disengage the collar 88 from the pivot pin 92 at the front of the wheelchair 52 to hold the cross-braces 54 in the opened or unfolded position.

Figure 9:
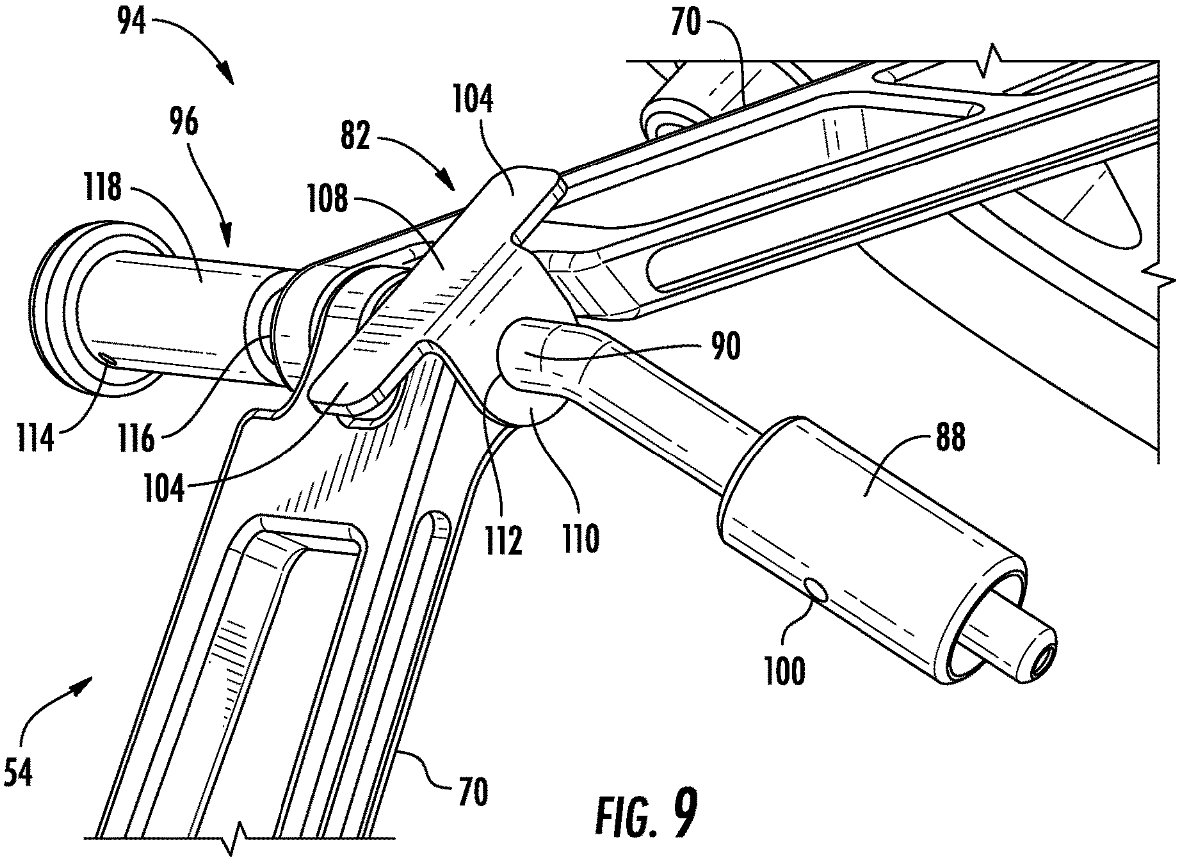
Figure 10:
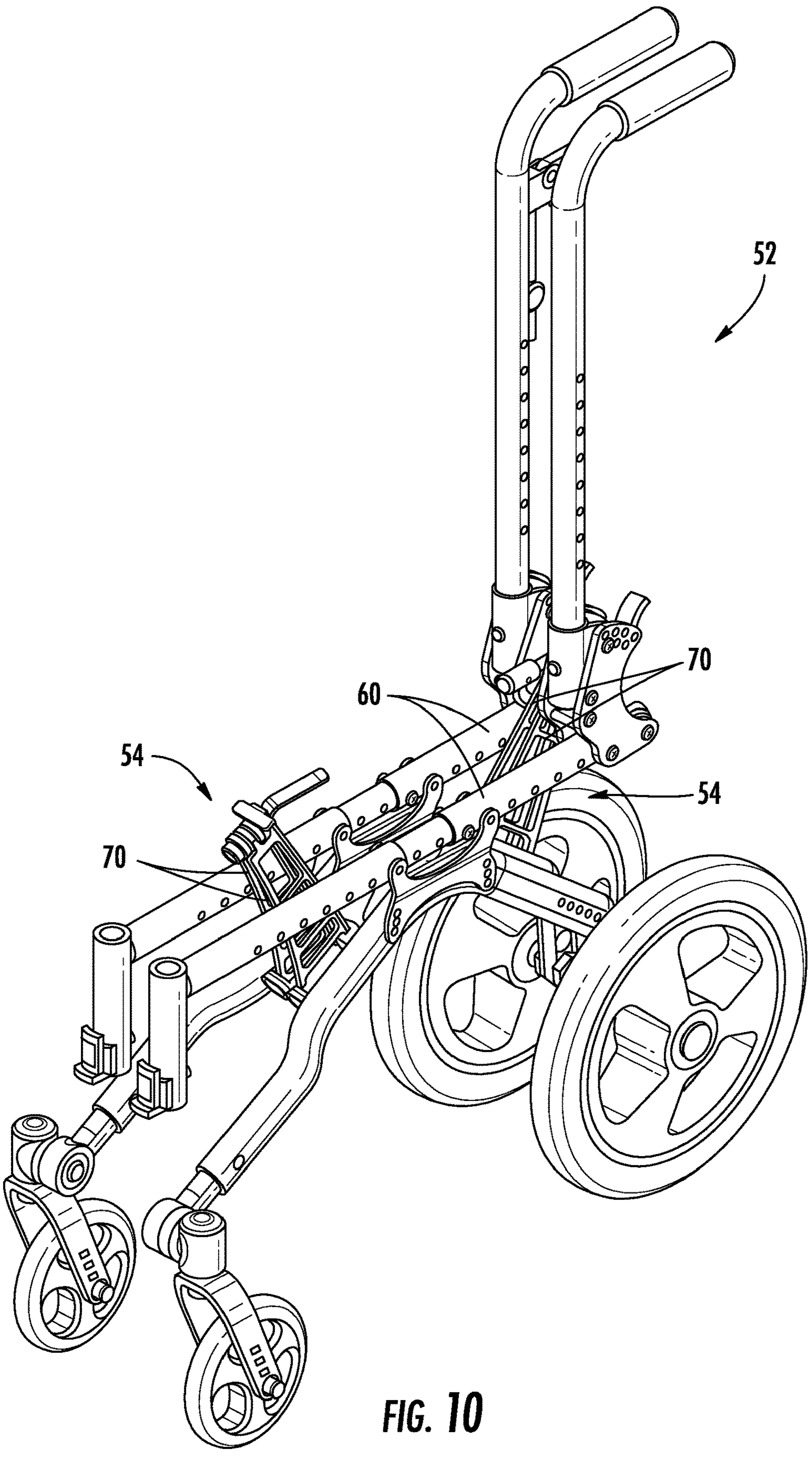
FIG. 10 is a perspective view of the wheelchair with open frame for seating system, wherein the wheelchair is folded.

FIG. 9 shows an enlarged view of the pull handle and collar latch assembly 94 shown in FIG. 8. The stop 82 may be in the form of a pivot or hinge-limit flange 104 (shown in FIG. 9), which may be radially and axially fixed in relation to the pivot pins 90, 92 (reference number 92 is shown in FIGS. 7 and 8). The pivot or hinge-limit flange 104 functions to limit the opening or unfolding movement of the cross-braces 54 to about 180 degrees and self-align and center a latching portion, indicated generally with reference numeral 106 in FIG. 7, of the pivot pins 90, 92. This mates or axially aligns the collar 88 to extend and lock the pivot pins 90, 92 into the unfolded position. In other words, as the cross-brace 54 opens or unfolds, the cross-brace members 70 approach the hinge-limit flange 104, and contact the hinge-limit flange 104, and move the hinge-limit flange 104 together with the pivot pins 90, 92 to center the pivot pins 90, 92. The hinge-limit flange 104 may be comprised of a plate 108 or other suitable structure, and a tab 110 at an angle to the plate 108, with a hole 112 passing through the tab 110 for receiving a pivot pin 90, 92. The pivot pins 90, 92 may be fixed in relation to the tabs 110 in any suitable manner, such as by tacking, brazing, welding, or some other suitable manner. The rear pivot pin 90 (to the left when viewing FIG. 7) may be a hollow pin or tubular member, through which a cable 98 (shown in FIG. 8) passes, as mentioned above. One end (i.e., a distal end) of the cable 98 may be fixed in relation to the collar 88 by a laterally extending pin 100, as mentioned above, and another or opposing end (i.e., a proximal end) of the cable 98 may be fixed in relation to the pull handle 96 by another laterally extending pin 114. The laterally extending pins 100, 114 may be roll pins, which pass through holes (shown but not referenced) passing through the collar 88 and a reduced diameter portion of the handle 96. The internal spring 102 housed in the collar 88 biases the collar 88, the cable 98 and the pull handle 96 forward (to the right when viewing FIG. 7) in the illustrated embodiment. To release the collar 88, the handle 96 may be pulled rearward (to the left when viewing FIG. 7) to move the collar 88 rearward to release the collar 88 from engagement with the pivot pin 92 at the front of the wheelchair 52 to enable the cross-brace members 70 to be closed or folded, thus allowing the side frames 60 to move toward one another, to fold the wheelchair 52, as shown in FIG. 10. Upon releasing the pull handle 96, the spring 102 biases the collar 88 forward (to the right view viewing FIG. 7) so as to become engaged with the pivot pin 92 at the front of the wheelchair 52 (to the right when viewing FIG. 7) to hold the cross-braces 54 in the opened or unfolded position.

A rear portion of the rear pivot pin 90 (to the left when viewing FIG. 7) may be received in a sliding manner into an opening 116 to a forward cylindrical portion 118 of the pull handle 96, which may have a knob 120 at a rear portion thereof (to the left when viewing FIG. 7) for grasping by a user to pull the pull handle 96 rearward (to the left when viewing FIG. 7) to disengage or uncouple the pivot pins 90, 92. As shown in FIG. 8, a distal end 122 of each cross-brace member 70 may be comprised of hinge knuckles 124, which may form a yoke 126 for receiving a mating knuckle 124 of the opposing or cooperating cross-brace member 70. Of course, the pivot pins 90, 92 may pass through holes 128 in the knuckles 124. However, it should be appreciated that the pivots 84 may be formed in any suitable manner.

As shown in FIG. 10, with the open framed wheelchair 52 folded, the end or folded position of the cross-braces 54 allows for a tightly folded width for the folded cross-braces 54 and a limited amount of extension of the folded cross-braces 54 beyond the top of a seating surface.

Figure 11:
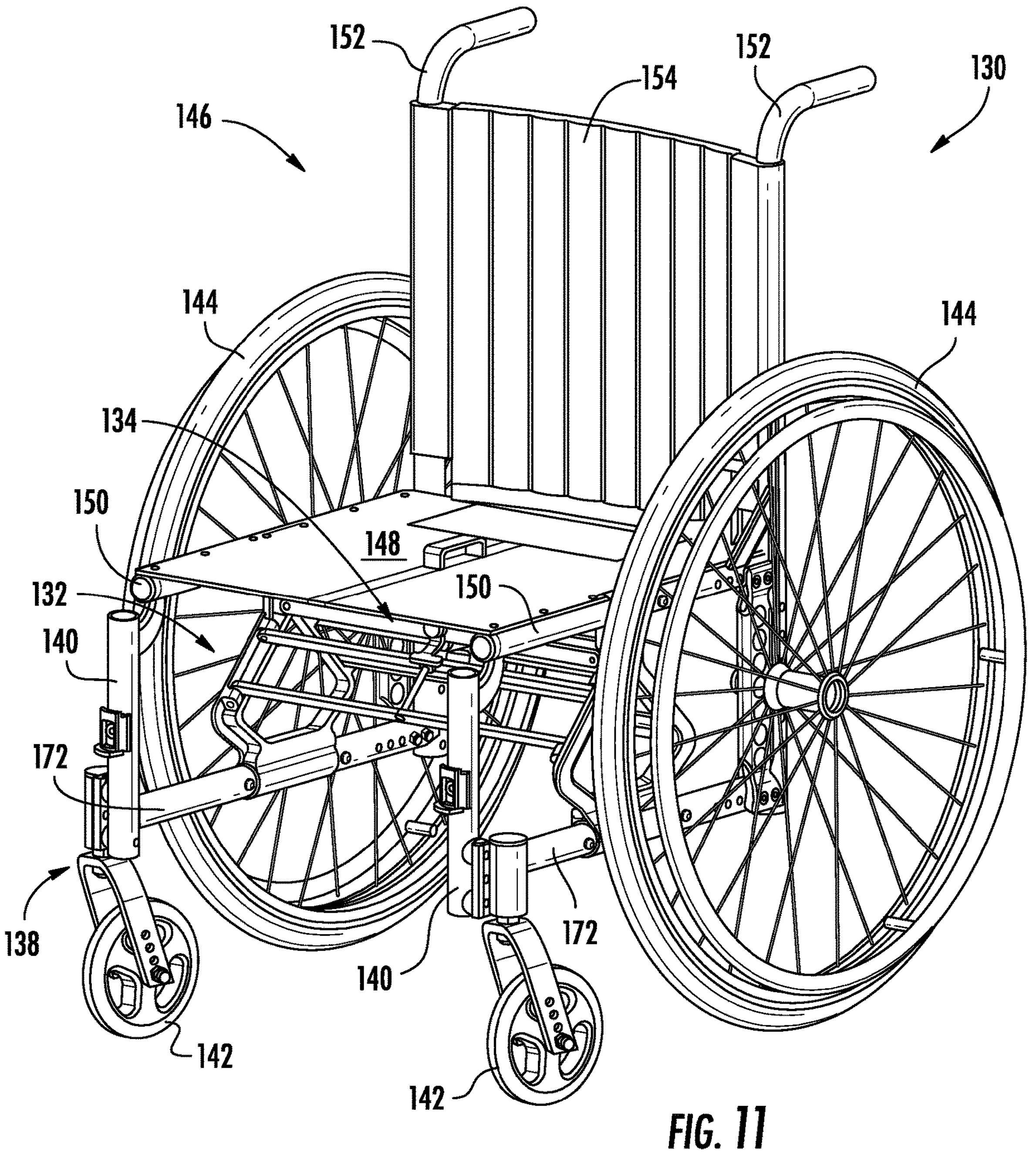
FIG. 11 is a perspective view of a wheelchair with a sling seating system, wherein the wheelchair is unfolded.

Now with reference to FIG. 11, there is illustrated a sling seat wheelchair 130 in an unfolded position, using two planar cross-braces or members 132 and a central folding mechanism 134. The opposed cross-braces 132 reside in non-parallel planes P5, P6 (shown in FIG. 12) when unfolded. Although only one cross-brace 132 is clearly shown due to the angle of the wheelchair 130 shown in the drawings, it should be understood that the two cross-braces 132 are the same or substantially the same. The wheelchair 130 may be comprised of a central self-aligning latch system 136 (shown in FIG. 12) that locks the cross-braces 132 in an opened or unfolded position. The wheelchair 130 may comprise a base frame 138 comprising the cross-braces 132 and opposing side frames 140, with front caster wheels 142 and rear drive wheels 144 for propelling the wheelchair 130. The caster and driven wheels 142, 144 may be supported in relation to the side frames 140 for supporting the side frames 140 in relation to a supporting surface. A seat 146, including a seat sling 148 supported in relation to an upper tube 150 of the side frames 140 and back tubes or canes 152 supporting a seat back 154, for supporting a wheelchair occupant. Although the base frame 138 and back canes 152 shown are generally formed of tubular construction, with brackets supporting adjoining components or parts, the wheelchair 130 may be formed in any suitable manner. The base frame 138 and back canes 152 may be formed of metal or other suitable material, and various components or parts thereof may be formed of metal or plastic, or other suitable materials or a combination of materials. Various parts and components of the wheelchair 130 may be adjustable, telescopically or otherwise, and joined together using weldments and/or threaded fasteners, or other suitable fasteners, such as those shown but not referenced throughout the drawings.

Figure 12:
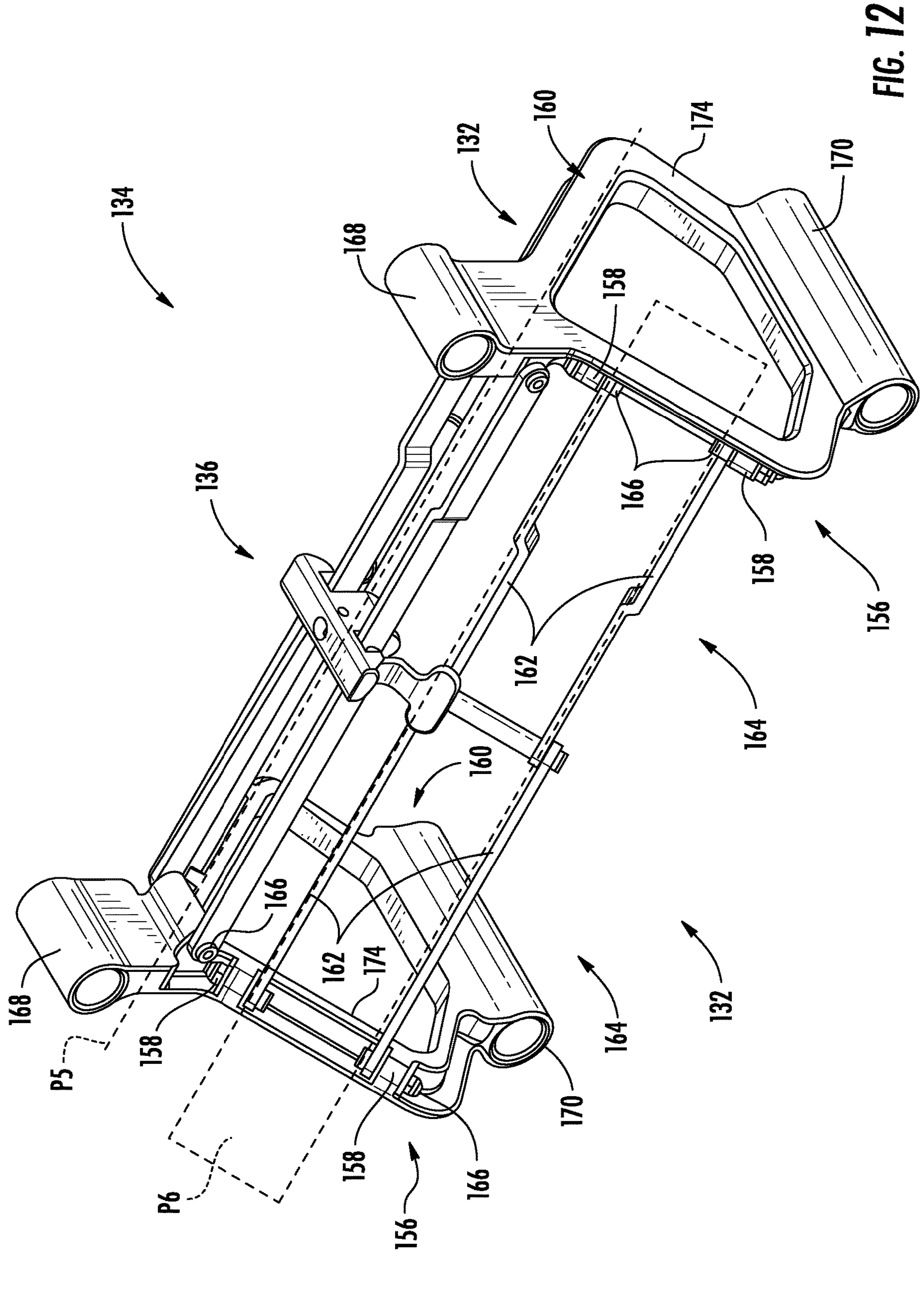
FIGS. 12-13 are perspective views of a fold and latch system for the wheelchair shown in FIG. 11.
Figure 13:
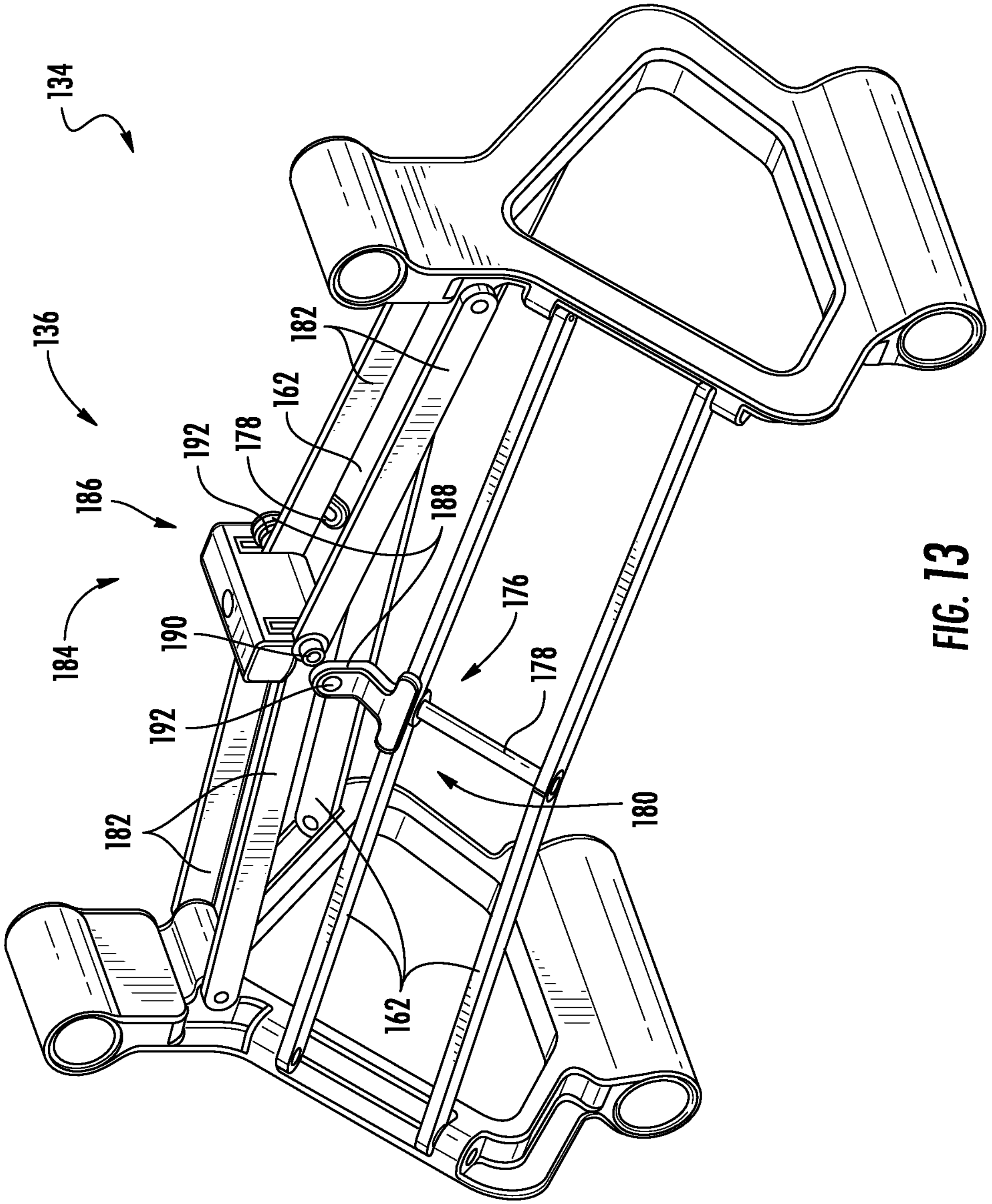

As shown in FIG. 12, the cross-braces 132 may be supported for pivotal movement in relation to the side frames 140 (shown in FIG. 11) by a pivot 156, which may include pivot bosses 158 supported in relation to side frame members 160. The pivot bosses 158 may axially align with links 162 of cross-brace members 164, and a pivot pin or pins 166 or other suitable structure for coupling the bosses 158 to the side frame members 160.

As shown in FIG. 12, the cross-brace links 162 may be supported in relation to upper and lower sleeves 168, 170 from receiving upper and lower tubes 150, 172 (shown in FIG. 11) of respective side frames 140 and may be fixed in relation to the upper and lower tubes 150, 172. The upper and lower sleeves 168, 170 may be held in vertically spaced relation to one another by an interconnecting or bridge structure 174, which may provide support for the pivot 156 that supports the cross-braces 132 in relation to the side frames 140 (shown in FIG. 11).

As shown in FIG. 12, the cross-brace links 162 and a central latch system 136 are shown in an engaged and locked position, with the cross-braces 132 (shown in FIG. 11) unfolded, with stops, indicted generally at 176, engaging the cross-brace members 164 (referenced in FIG. 12) to limit the movement or travel of the cross-brace members 164. As shown in the drawings, the cross-brace members 164 may be substantially planar members, which may be formed by links 162, as shown in FIG. 12, as mentioned above, but may be formed in another suitable manner. The cross-brace members 164 may be joined together with a central pivot 178, similar to the cross-brace pivots 16, 66 described above, with the stops 176 supported in relation to the pivot 178. The stops 176 may be comprised of a plate 180 that extends from the pivot 178 in opposing directions in relation to the pivot 178 so as to be engageable with opposing cross-brace members 164 when the cross-brace 132 is moved to the opened or unfolded position. The cross-brace 132 may be held in the opened or unfolded position by the central latch system 136, as will become more apparent in the description that follows.

Figure 14:
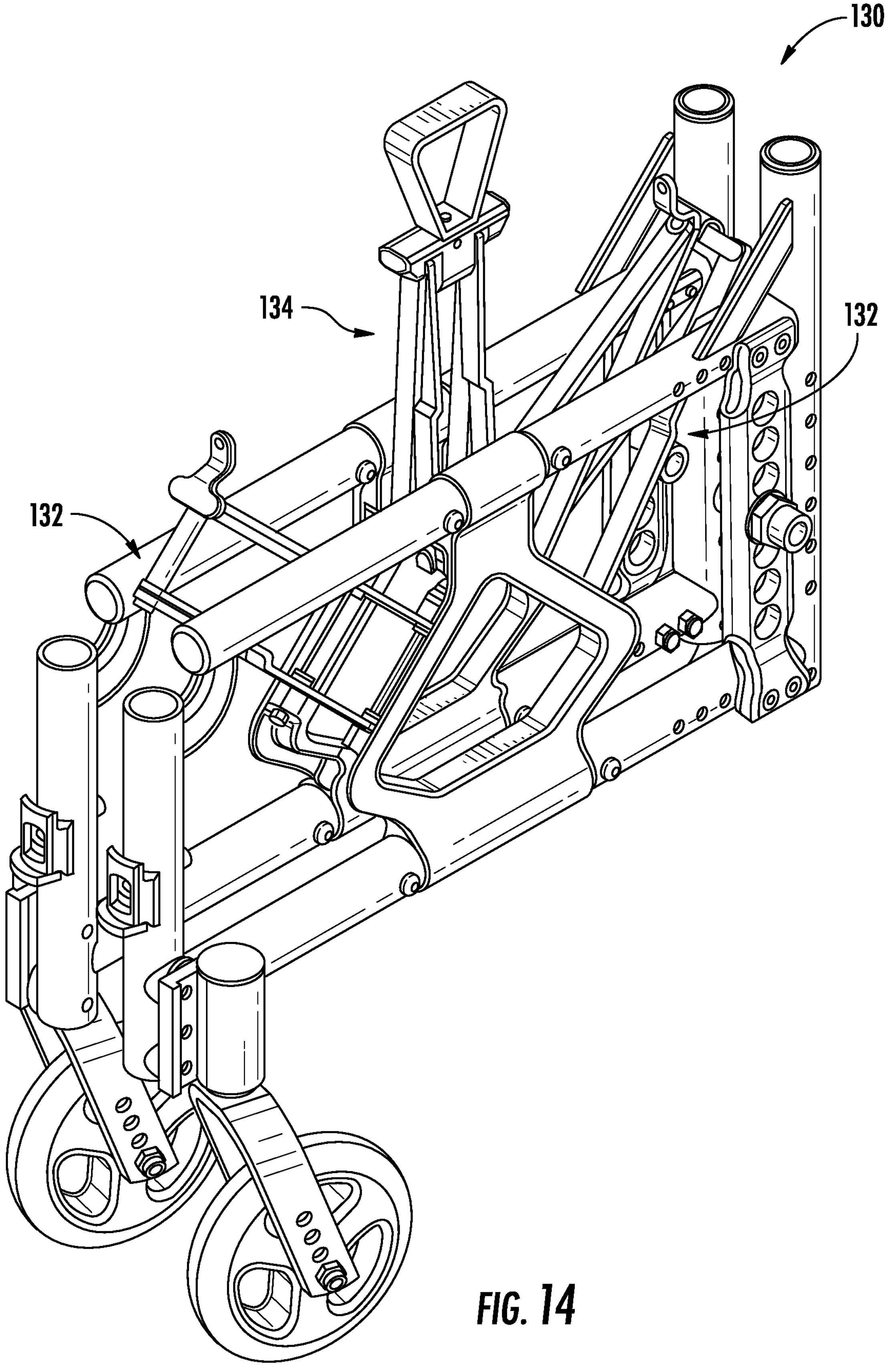
FIG. 14 is a perspective view of the wheelchair shown in FIG. 11 with a seat sling and seat back removed to show a central folding mechanism thereof fully folded.

The central folding mechanism 134, with the cross-brace links 162 and central latch system 136 in a disengaged position, allows the cross-braces 132 to fold. The central latch system 136 may be comprised of latch links 182 and a latch 184. The latch 184 may be releasable by pulling upwards on a self-aligning, spring loaded latch block 186. This may disengage tabs 188 supported in relation to the stops 176 from central pivot pins 190 supported in relation to the latch links 182 and latch block 186. More particularly, the central pivot pins 190 may become disengaged from holes 192 in the tabs 188 as the latch block 186 is pulled upward. As should be clearly understood, pulling the latch block 186 upward, may raise the latch links 182, while at the same time, fold the cross-braces 132, and as the cross-braces 132 fold, the central pivot pins 190 may become disengaged from holes 192 in the tabs 188. Continued movement of the latch block 186 and latch links 182 in an upward direction, may allow the cross-braces 132 to pull further away from central pivot pins 190 until the cross-braces 132 are moved to the fully closed or unfolded position, as shown in FIG. 14. The latch block 186 may be configured to be tethered to the seat sling 148 to allow the pulling upward of the seat sling 148 to initiate folding of the wheelchair 130.

FIG. 14 shows the folded wheelchair 130 with the central folding mechanism 134 fully folded to illustrate the compact and limited interference caused by the vertical extension of the cross-braces 132.

Figure 15:
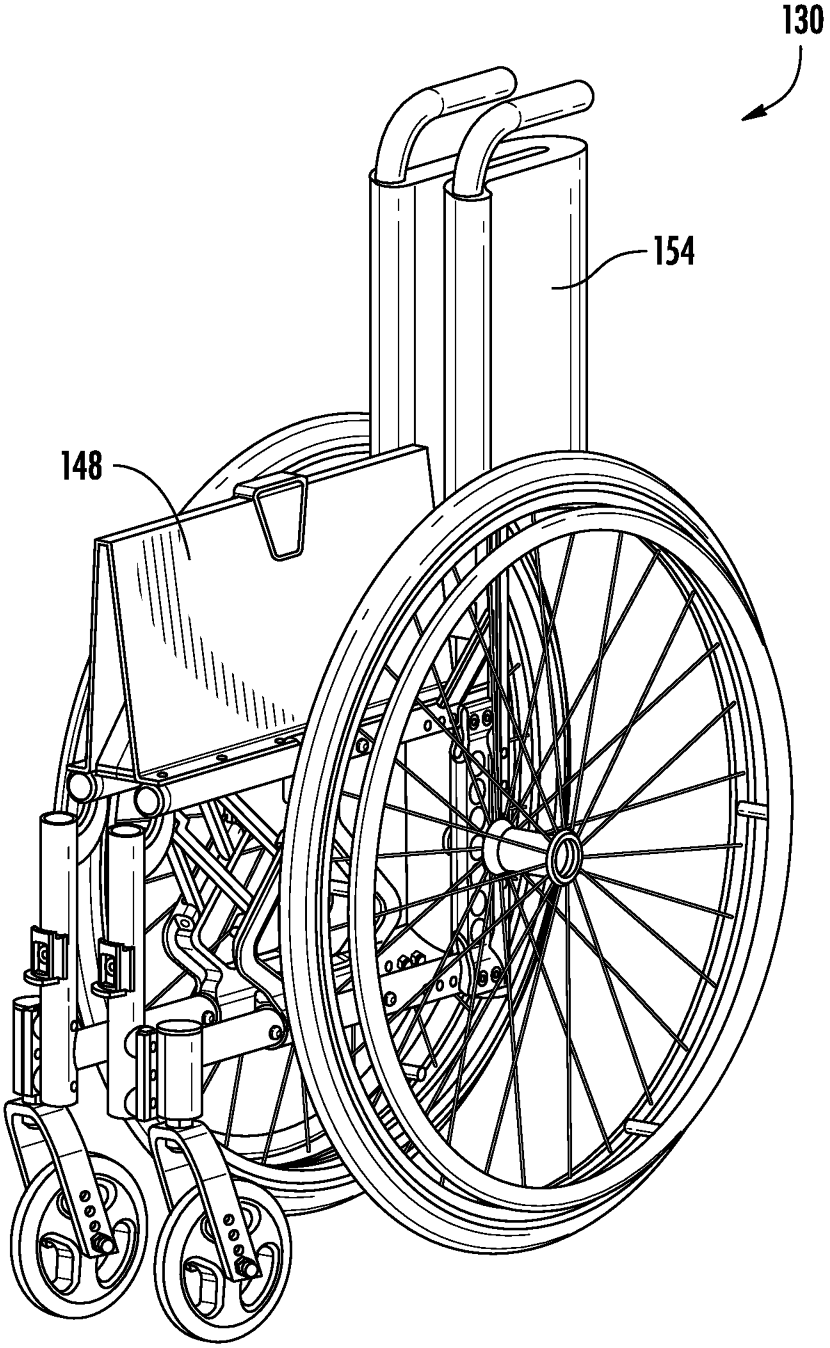
FIG. 15 is a perspective view of the wheelchair shown in FIG. 11 with the wheelchair folded and illustrating limited cross-brace interference with the seat sling and seat back.

FIG. 15 shows the folded wheelchair with seat and backrest upholstery (i.e., seat sling 148 and seat back 154) shown to illustrate the benefit of limited cross-brace interference in allowing the wheelchair 130 to fold.

Figure 16:
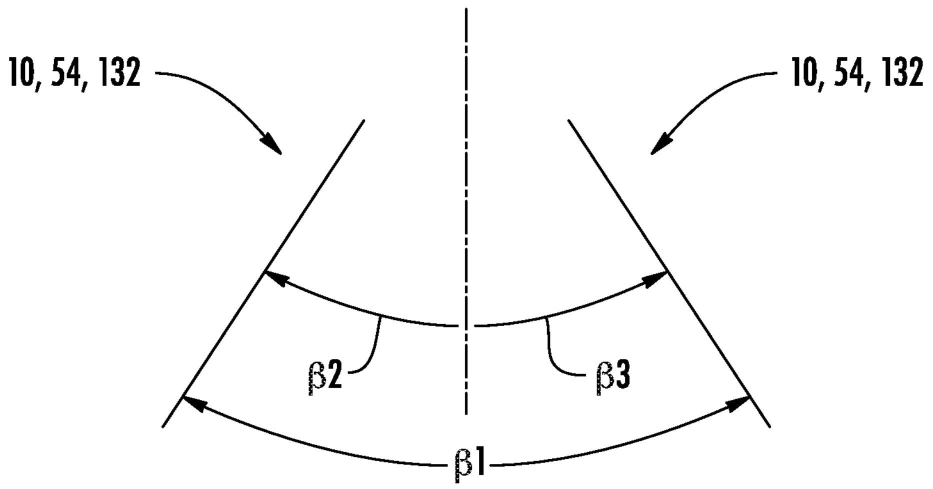
FIG. 16 is a diagrammatic representation of cross-braces in an opened or unfolded condition, positioned in non-parallel planes.

As is diagrammatically represented in FIG. 16, the cross-braces 10, 54, 132, when in an opened or unfolded condition, are positioned in non-parallel planes. In the illustrated embodiment, the cross-braces 10 shown in FIGS. 1-5 may be disposed at an angle β1 of about 80 degrees in relation to one another, or each at angles β2, β3 of about 40 degrees in relation to a vertical plane. The cross-braces 54 shown in FIGS. 1-5 may be disposed at an angle β1 of about 110 degrees in relation to one another, or at angles β2 of about 60 degrees and 33 of about 50 degrees in relation to a vertical plane. The cross-braces 132 may be disposed at an angle β1 of about 90 degrees in relation to one another, or each at angles β2, β3 of about 45 degrees in relation to a vertical plane, or some other suitable angles. It should be appreciated that the angles β2, β3 could be different angles.

Figure 17:
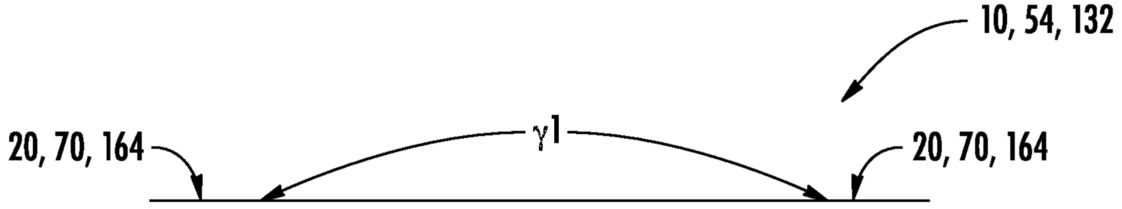
FIG. 17 is a diagrammatic representation of cross-braces fully opened at an angle of about 180 degrees.
Figure 18:
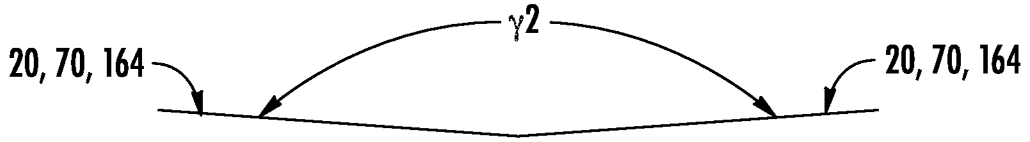
FIG. 18 is a diagrammatic representation of cross-braces fully opened at some angle less than 180 degrees.

As is diagrammatically represented in FIG. 17, the cross-braces 10, 54, 132 are fully opened, preferably at an angle γ1 about 180 degrees, so that the cross-brace members 20, 70, 164 lie in substantially the same plane, as shown in the drawings. It should be appreciated that movement of the cross-brace members 20, 70, 164 may be limited to some angle γ2 less than 180 degrees.

It should be appreciated that the invention provides configurations of frames that are better suited for the attachment of seating systems than conventional cross brace folding frames. The frame unfolds into a rigidly locked geometry to provide a stable frame for improved mobility performance. The invention provides an alternative frame geometry that can be more compactly folded without interference with other frame components. The invention also allows the attachment of a sling seat and back upholstery to the main frame of the wheelchair without interference from the folding mechanism. The invention further enables freedom of frame geometry that can provide a more aesthetic design.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 non-parallel folding planar cross-braces
12 side frames
P1, P2 non-parallel planes
16 pivot or hinge
18 stop
20 member (of cross-braces)
22 knuckle (of pivot)
24 distal end (of cross-brace member)
26 proximal end (of cross-brace member)

32 hole (through knuckle)
34 pin
36 head
38 fastener
40 side frame pivot
42 sleeve
44 through hole
46 C-shaped bracket
48 holes
50 pin
52 open-framed wheelchair
54 non-parallel planar cross-braces
P3, P4 non-parallel planes
α angle
56 central self-aligning latch
58 base frame
60 side frames
62 front casters
64 rear wheels
66 pivot
68 pivot bosses
70 cross-brace members
72 tabs
74 pivot pin
76 seat frame
78 seat tubes
80 back canes
82 stops
84 pivot
86 latching members (of central self-aligning latch)
88 sliding collar
A axis (of aligned pivot pins)
90, 92 pivot pins
94 pull handle and collar latch assembly
96 sliding pull handle
98 cable
100 laterally extending pin
102 internal spring
104 pivot or hinge-limit flange
106 latching portion
108 plate (of pivot-limit flange)
110 tab (of pivot-limit flange)
112 hole (of pivot-limit flange)
114 laterally extending pin (through pull-handle)
116 opening (in rear pivot pin)
118 cylindrical portion (or pull handle)
120 knob
122 distal end (of cross-brace members)
124 knuckle
126 yoke formed between knuckles)
128 holes (in knuckles)
130 sling seat wheelchair
132 planar cross-braces
134 central folding mechanism
P5, P6 non-parallel planes
136 central self-aligning latch system
138 base frame
140 side frame
142 front casters
144 rear driven wheels
146 seat
148 seat sling
150 upper tube (of side frames)
152 back canes
154 seat back
156 pivot
158 pivot bosses

160 side frame members
162 links (of cross-brace members)
164 cross-brace members
166 pivot pin(s)
168 upper sleeves
170 lower sleeves
172 lower tube
174 bridge structure
176 stops
178 central pivot
180 plate
182 latch links
184 latch
186 self-aligning, spring loaded latch block
188 tabs
190 central pivot pins
192 holes
194 holes
196 seat upholstery
198 backrest upholstery
β1 angle of planes of cross-braces
β2, β3 angle of planes of cross-braces from vertical plane
γ1 angle of the cross-braces fully opened
γ2 alternative angle of the cross-braces fully opened

What is claimed is:

1. A folding wheelchair comprising:
a base frame having side frames,
wheels for supporting the base frame in relation to a supporting surface,
a seat frame supported in relation to the base frame for supporting an occupant,
non-parallel foldable cross-braces configured to fold away from one another to a stable unfolded condition, the cross-braces each comprising a cross-brace pivot and a stop supported in relation to the pivot and configured to limit movement of the pivot and thus, limit movement of the cross-brace to the unfolded condition,
wherein the cross-braces comprise cross-brace members each having a distal end joined for pivotal movement in relation to the distal end of the other cross-brace by the cross-brace pivot, and
wherein at least one of the stops is supported in relation to the distal end of each one of the cross-brace members.

2. The wheelchair of claim 1, wherein the cross-brace members each comprise a proximal end opposite the distal end, the proximal end of each one of the cross-brace members having a side frame pivot for supporting the cross-brace members for pivotal movement in relation to the side frames.

3. The wheelchair of claim 1, wherein the movement of the cross-brace members in relation to one another is limited to about 180 degrees or less.

4. The wheelchair of claim 1, wherein the cross-brace members are substantially planar so that the cross-brace members are foldable side-to-side or substantially side-to-side so that the side frames are juxtaposed or substantially juxtaposed the cross-brace members in a compact orientation.

5. The wheelchair of claim 1, the cross-brace pivots are medial of the cross-braces.

6. The wheelchair of claim 1, further comprising a sling seat supported in relation to the seat frame.

7. A folding wheelchair comprising:
a base frame having side frames, wheels for supporting the base frame in relation to a supporting surface, a seat frame supported in relation to the base frame for supporting an occupant, non-parallel foldable cross-braces configured to fold away from one another to a stable unfolded condition, the cross-braces each comprising a cross-brace pivot and a stop supported in relation to the pivot and configured to limit movement of the pivot and thus, limit movement of the cross-brace to the unfolded condition, wherein the cross-braces comprise cross-brace members each having a distal end joined for pivotal movement in relation to the distal end of the other cross-brace by the cross-brace pivot, and wherein the stops are in the form of a structure extending from each one of the cross-brace members engageable with the other one of the cross-brace members upon unfolding the cross-braces to limit the movement of the pivot and thus limit movement of the cross-brace members in relation to one another.

8. The wheelchair of claim 7, wherein the cross-brace members each comprise at least one knuckle at the distal end of the cross-brace members, the knuckle being joined by a pin to form the pivot.

9. The wheelchair of claim 8, wherein the structure extending from each one of the cross-brace members is in the form of a finger, tab, extension, protrusion or plate extending from the at least one knuckle at the distal end of each one of the cross-brace members so as to be engageable with the distal end of the other one of the cross-brace members to limit the movement of the cross-brace members.

10. A folding wheelchair comprising:

a base frame having side frames, wheels for supporting the base frame in relation to a supporting surface, a seat frame supported in relation to the base frame for supporting an occupant, non-parallel foldable cross-braces configured to fold away from one another to a stable unfolded condition, the cross-braces each comprising a cross-brace pivot and a stop supported in relation to the pivot and configured to limit movement of the pivot and thus, limit movement of the cross-brace to the unfolded condition, and wherein the wheelchair is an open-frame wheelchair, and the cross-braces are planar cross-braces that reside in opposed non-parallel planes at an angle in relation to one another when unfolded, the wheelchair further comprising:

a central self-aligning latch that latches the cross-braces into an opened or unfolded position, the self-aligning latch comprising:

a first pin supported in relation to the pivot of a first one of the cross-braces, a second pin supported in relation to the pivot of a second one of the cross-braces; and a sliding collar supported for sliding movement along the first pin to a first position to engage the collar with the second pin when the cross-braces are in the folded condition and a second position to disengage the collar from the second pin when the cross-braces are in the unfolded condition.

11. The wheelchair of claim 10, wherein the sliding collar is spring biased to the first position to engage the collar with the second pin when the cross-braces are in the folded condition and in the absence of a force applied to the collar to disengage the collar from the second pin.

12. The wheelchair of claim 11, wherein the central self-aligning latch further comprises a pull handle coupled to the collar for applying force to the collar to disengage the collar from the second pin.

13. The wheelchair of claim 12, wherein the movement of the cross-brace members in relation to one another is limited to about 180 degrees or less.

14. The wheelchair of claim 12, wherein the hinge-limit flange of each one of the cross-braces comprises of a plate and a tab at an angle to the plate, with a hole passing through the tab for receiving the pivot pin the pivot pin of the cross-brace pivot of a corresponding one of the cross-braces.

15. The wheelchair of claim 11, wherein the first and second pins for a part of the pivot of each one of the cross-braces.

16. A folding wheelchair comprising:

a base frame having side frames, wheels for supporting the base frame in relation to a supporting surface, a seat frame supported in relation to the base frame for supporting an occupant, non-parallel foldable cross-braces configured to fold away from one another to a stable unfolded condition, the cross-braces each comprising a cross-brace pivot and a stop supported in relation to the pivot and configured to limit movement of the pivot and thus, limit movement of the cross-brace to the unfolded condition, and wherein the cross-braces comprise opposing cross-brace members, the cross-brace pivot of each one of the cross-braces comprises a pivot pin, and the stop comprised a hinge-limit flange supported in relation to the pivot pin of the cross-brace pivot of each one of the cross-braces and configured mutually engage the cross-brace members to limit the movement of the cross-braces to the unfolded condition.

17. A folding wheelchair comprising:

a base frame having side frames, wheels for supporting the base frame in relation to a supporting surface, a seat frame supported in relation to the base frame for supporting an occupant, non-parallel foldable cross-braces configured to fold away from one another to a stable unfolded condition, the cross-braces each comprising a cross-brace pivot and a stop supported in relation to the pivot and configured to limit movement of the pivot and thus, limit movement of the cross-brace to the unfolded condition, and wherein the cross-braces comprise cross-brace members each having a distal end joined for pivotal movement in relation to the distal end of the other cross-brace by the cross-brace pivots, and wherein the stops comprise of a plate that extends from each one of the cross-brace pivots so as to be engageable with opposing ones of the cross-brace members when the cross-brace is moved to the unfolded position.

18. The wheelchair of claim 17, further comprising opposing cross-brace links and a central latch system, the cross-brace links each having a proximal end pivotally coupled to the side frames and a distal end, the distal end of one of the cross-brace links being pivotally joined to the distal end of the other one of the cross-brace links by a central pivot, the stops each comprising a pin and the central pivot comprising holes engageable with the pins when the cross-braces are moved to the unfolded condition, the central latch system further comprising a latch block for trapping the pins in the holes, whereby lifting the latch block permits the pins to be released from the holes and the cross-braces to move to the folded condition.

* * * * *